United States Patent [19]

Wagner et al.

[11] 4,235,945

[45] Nov. 25, 1980

[54] HIGH RESISTIVITY ELECTROCONDUCTIVE TIN OXIDE FILMS

[75] Inventors: William E. Wagner, Verona; Vern A. Henery, Plum Borough, both of Pa.

[73] Assignee: PPG Industries, Inc., Pittsburgh, Pa.

[21] Appl. No.: 965,664

[22] Filed: Dec. 1, 1978

[51] Int. Cl.$^2$ ............................................... B05D 5/12
[52] U.S. Cl. .................................. 427/126.3; 427/108; 427/110; 427/314; 427/126.2
[58] Field of Search ............... 427/108, 110, 126, 314; 65/60 D

[56] References Cited

U.S. PATENT DOCUMENTS 2,724,658  11/1965  Lytle ..................................... 427/110
3,107,177  10/1963  Saunders ............................... 427/110

Primary Examiner—Shrive P. Beck
Attorney, Agent, or Firm—Donna L. Seidel

[57] ABSTRACT

A method is disclosed for pyrolytically forming electroconductive tin oxide films having higher resistivity for a given thickness than tin oxide films formed by known methods by adding to the film forming solution an organic compound which retards the rate of film formation reducing the particle size of the tin oxide film thus increasing the resistivity of the film. Small quantities of an organic compound such as cresol or benzyl alcohol added to the film-forming solution may increase the resistivity by a factor of five for a typical film thickness.

4 Claims, No Drawings

HIGH RESISTIVITY ELECTROCONDUCTIVE TIN OXIDE FILMS

FIELD OF THE INVENTION

The present invention relates generally to the art of depositing metal oxide films on nonmetallic surfaces by thermal decomposition of metal-containing coating reactants and more particularly to the art of depositing electroconductive tin oxide films by pyrolysis.

THE PRIOR ART

Transparent, electroconductive tin oxide films may be deposited on a refractory substrate such as glass by applying thermally decomposable tin compounds to a heated surface. For example, in U.S. Pat. No. 3,107,177 Saunders et al disclose a family of filming compositions and novel filming techniques that produce tin oxide films having high transparency, high electroconductivity, good electrical contact with bus bars and substantially no haze. The coating operation involves contacting a hot glass surface with an organic solution of an organic tin compound and a halogen-containing compound such as hydrofluoric acid.

In U.S. Pat. No. 3,677,814 Gillery discloses a method for forming transparent electroconductive tin oxide films by pyrolysis of a solution containing organic tin fluorides which have a direct tin-fluoride bond. The electroconductivity of the film varies with the film thickness, which is determinable by the interference color of the film. For example, films of about 270 millimicrons (nanometers) thickness, having an interference color of second order red, have a surface resistivity of about 15 ohms per square.

Typical transparent, electroconductive (surface resistivity less than $10^4$ ohms per square) tin oxide films having a resistivity of about 200 ohms per square are relatively thin (less than 250 nm) and colorless. Thicker films (250 to 350 nm) having interference colors of first order red to second order blue generally have resistivities of 40 ohms per square or less.

SUMMARY OF THE INVENTION

The present invention is a method for increasing the resistance of an electroconductive metal oxide film formed by the pyrolysis of an organometallic compound by adding to a solution of the organometallic compound a high boiling point organic compound which reduces the particle size of the metal oxide film and retards the rate of film formation in turn raising the resistivity of the metal oxide film.

DESCRIPTION OF THE PREFERRED EMBODIMENT

The present invention is particularly suited for forming a transparent electroconductive film on a refractory substrate. While ordinary soda-lime-silica glass is a preferred substrate, other refractory materials such as borosilicates, china, mica, porcelain, silicon carbide, tungsten carbide and phosphate glass are also useful, as well as other substrates capable of withstanding the pyrolytic deposition temperatures. Tin oxide is a preferred electroconductive film.

The substrate to be coated is heated to a temperature sufficiently high to pyrolyze a tin-containing coating reactant, typically a temperature of at least about 400° F. (about 204° C.) but below the temperature at which the substrate becomes physically or chemically unstable. The present invention is especially adaptable for forming a transparent electroconductive tin oxide film on a float glass ribbon while it is still at a temperature above about 600° F. (about 315° C.), preferably at a temperature between 900° and 1350° F. (about 482° and 732° C.), most preferably between about 1100° and 1250° F. (about 593° and 677° C.).

The hot surface is contacted with a tin containing coating composition, preferably a solution of an organometallic tin compound. Suitable organotin compounds include dibutyl tin diacetate, dibutyl tin oxide, dibutyl tin dilaurate, tributyl tin acetate, dibutyl tin di-2-ethyl hexoate, stannous acetate, stannous octoate, tributyl tin chloride, dilauryl tin dichloride, tetrabutyl tin and other organotin compounds such as those disclosed in U.S. Pat. No. 3,107,177 which disclosure is incorporated herein by reference. Also suitable are organotin compounds having tin-fluoride bonds such as dimethyl tin difluoride and other alkyl or aryl tin fluorides such as those disclosed in U.S. Pat. No. 3,677,814 which disclosure is incorporated herein by reference.

Suitable solvents for the organotin coating reactants most useful in the practice of the present invention include water and numerous organic solvents, particularly polar organic solvents such as alcohols and amines. A preferred solvent is methanol. When organotin coating reactants which do not contain fluoride are employed, the solvent preferably comprises hydrofluoric acid in methanol. When organotin fluoride coating reactants are employed, the solvent preferably comprises an alcohol, especially methanol, and water. The solvent preferably further comprises ammonia or an amine such as trimethylamine, ethylamine or triethylamine.

Upon contact with the hot surface of the substrate, the tin-containing coating composition thermally reacts to deposit an electroconductive tin oxide coating.

According to the present invention, the resistivity of a metal oxide coating can be increased for a given film thickness by adding to the coating composition a high boiling point organic additive which retards the rate of film formation and reduces the particle size of the metal oxide, thus increasing the resistivity of the film.

Suitable organic additives are those compounds, compatible with the coating reactant and solvent, having a boiling point above about 200° C. Preferred organic additives include cresol, benzyl alcohol, catechol, hydroquinone, benzoquinone, and resorcinol. The concentration of the organic additives in the coating composition may range from about 0.5 to about 20 percent and is preferably from about 1 to 10 percent by volume of a solution of an organotin compound.

The present invention will be further understood from the descriptions of specific examples which follow.

EXAMPLE I

A coating solution is prepared having the following composition.

dibutyl tin diacetate: 5 gallons (21.2 liters)
30% hydrofluoric acid in methanol: 4.2 gallons (17.8 liters)
triethylamine: 3.8 gallons (16.1 liters)
ethylamine: 250 milliliters (0.25 liters)
hydrochloric acid: 800 milliliters (0.8 liters)

To the above standard coating solution is added cresol in the amount of 74 milliliters per gallon of solution.

This composition is sprayed onto a glass sheet at a temperature of about 1120° F. (about 604° C.). Spraying is discontinued when the coating reaches a thickness which results in a second order red to second order blue interference coloration, about 250 to 350 nanometers. The resistance of the coated surface is 300 ohms per square compared with less than 40 ohms per square for a film of comparable thickness deposited from the standard solution without the organic additive.

EXAMPLE II

On a larger scale, a float glass ribbon is contacted while at a temperature of about 1175° F. (about 635° C.) with a coating composition having the following components.
 dibutyl tin diacetate: 11 gallons (46.6 liters)
 30% hydrofluoric acid in methanol: 6 gallons (25.4 liters)
 triethylamine: 6.7 gallons (28.4 liters)
 ethylamine: 8 gallons (33.9 liters)
 hydrochloric acid: 2100 milliliters (2.1 liters)
plus 2 parts cresol per 100 parts by volume of the above standard solution. A coating is deposited to a thickness which results in interference coloration of first order red to second order blue. The resistance of the coated surface is 560 ohms per square.

The method described herein is useful in the production of electroconductive coated glass for windows, especially for aircraft. While the invention has been described in detail with respect to tin oxide films, it is not so limited. The method of the present invention may be employed to increase the resistivity of other electroconductive metal oxide films, including spinel-type films as disclosed in commonly assigned U.S. Ser. No. 887,384 filed Mar. 16, 1978 which disclosure is incorporated herein by reference. The present invention as illustrated by the above examples is limited only by the following claims.

We claim:

1. In a method for depositing an electroconductive metal oxide film by contacting a substrate at a temperature between about 400° F. (about 204° C.) and a temperature at which the substrate becomes unstable with a coating composition comprising a metal-containing compound which thermally reacts to form an electroconductive metal oxide upon contact with the substrate, the improvement which comprises adding to said coating composition a high boiling point organic compound selected from the group consisting of cresol, benzyl alcohol, catechol, hydroquinone, benzoquinone and resorcinol.

2. A method according to claim 1, wherein the coating composition comprises an organotin compound and a solvent for said organotin compound.

3. A method according to claim 2, wherein the coating composition further comprises a fluorine-containing compound.

4. A method according to claim 3, wherein the coating composition comprises a compound containing both tin and fluorine.

* * * * *